United States Patent [19]

Hayden et al.

[11] Patent Number: 5,724,460
[45] Date of Patent: Mar. 3, 1998

[54] PHOTOREFRACTIVE THIN FILM POLYMER WAVEGUIDE TWO BEAM COUPLING (WTBC) DEVICE

[75] Inventors: L. Michael Hayden, Mt. Airy; Dan Kokron, Severn; Stephen M. Evanko, Ellicott City, all of Md.

[73] Assignee: University of Maryland Baltimore County, Baltimore, Md.

[21] Appl. No.: 670,449

[22] Filed: Jun. 26, 1996

[51] Int. Cl.$^6$ .................................................. G02F 1/295
[52] U.S. Cl. ........................................................ 385/4
[58] Field of Search ............................ 359/3, 4, 5, 7, 359/34; 385/5, 122

[56] References Cited

U.S. PATENT DOCUMENTS 5,161,039  11/1992  Schellenberg ........................... 359/3
5,361,148  11/1994  Bjorklund et al. .................... 385/5 X

OTHER PUBLICATIONS

"A photorefractive polymer with high optical gain and diffraction efficiency near 100%" by Meerhloz et al., Oct. 6, 1994, vol. 371, Letters to Nature, pp. 497–500.

"Wave Mixing and Beam Profile Control in a Photorefractive Waveguide", Mar. 15, 1995, vol. 20, No. 6 *Optics Letters*, pp. 563–565, by Yu et al.

"A Photorefractive Polymer with High Optical Gain and Diffration Efficiency Near 100%", Oct. 6, 1994, vol. 371, *Letters to Nature*, pp. 497–500, by Meerholz et al.

"Photorefractive Waveguide and Nonlinear Mode Coupling Effects", Feb. 20, 1989, *Appl Phys Lett*, 54, pp. 684–686, by Fischer et al.

"Photorefractive Crystal Waveguide with Periodically Reserved c Axis for Enhanced Two–Wave Mixing", *Appl. Phys. Lett.* 59, 1932 (1991) by Ito et al.

*Primary Examiner*—Akm E. Ullah
*Attorney, Agent, or Firm*—Sughrue, Mion, Zinn, Macpeak & Seas, PLLC

[57] ABSTRACT

A photorefractive polymer waveguide is used to perform waveguide two beam coupling. Light incident on the waveguide interferes with scattered incident light or an input signal to create a modulated index pattern in the waveguide. The incident light is diffracted by the modulated index pattern to amplify signals in the waveguide in the direction of signal propagation.

13 Claims, 6 Drawing Sheets

PHOTOREFRACTIVE THIN FILM POLYMER WAVEGUIDE TWO BEAM COUPLING (WTBC) DEVICE

FIELD OF INVENTION

This invention relates to a low loss polymer waveguide having a photorefractive effect. An external pump beam incident to the waveguide is used to amplify signals and to launch guided modes.

DESCRIPTION OF THE RELATED ART

A material is said to exhibit a photorefractive (PR) effect when light incident on the material causes a change in the index of refraction of the material. The PR effect may be observed by combining the electro-optic and photoconductive properties of a sample to which an electric field is applied. The intersection of two light beams in a photorefractive material creates an interference pattern which results in the redistribution of charge in the material. The charges, generated by the incident light through the photoconductive effect, migrate from the bright interference fringe areas to the dark fringe areas. The charge separation creates a periodic internal space charge field due to the fringe patterns. This charge field modulates the index of refraction of the material through an electro-optic effect.

The photorefractive effect described above has been observed in inorganic crystals and has been described in "Photorefractive waveguides and nonlinear mode coupling effects," B. Fischer and M. Segev, *Appl. Phys. Lett.* 54, 684 (1989). In using a photorefractive crystal for waveguide applications, the two interfering beams comprise an incident pump beam and a signal beam. The resulting modulated index pattern acts as a grating to diffract the incident pump beam in the direction of the propagation of the signal beam. This two beam coupling amplifies the signal beam. In a crystal PR waveguide, it has also been noted that a single external pump beam can produce its own grating coupler for two beam coupling. This is because in a PR waveguide, the "signal" beam may be derived from light that is scattered from an intense pump beam into the allowed guided modes. These weak scattered beams interact with the pump beam along the transverse dimension of the pump as described above. The resulting interference pattern and charge separation modulates the material's index of refraction. The modulated index pattern diffracts the incident pump beam in the transverse direction of the material, launching guided modes. This effect was first observed in 70–100 µm thick slabs of crystalline BaTiO₃ in Fischer et al.

The conventional crystalline PR materials have attendant characteristics that limit their application in semiconductor, microelectronics, and communication applications. First, crystalline material processing and manufacturing techniques are not compatible with existing semiconductor processing. Therefore, crystalline waveguides cannot be easily integrated with current microelectronic circuits, optical sources and detectors. Second, crystalline PR materials require significant manufacturing costs. Third, limited sensitivity to infrared (IR) radiation of available crystalline PR materials limits the range of applications for these PR materials. By contrast, a wider range of materials with chemically selectable transparencies and IR sensitivities is available to make polymer PR devices. Therefore, polymers may be applied to a wider range of applications than crystalline materials.

Recently, the PR effect has also been observed in polymer slabs having thicknesses on the order of 100 µm. "A photorefractive polymer with high optical gain and diffraction efficiency near 100%," K. Meerholz et al. *Nature* 371, 497 (1994). In order to realize two beam coupling in these PR polymer slabs, a large electric field must be applied. In these conventional thick film geometries, an applied voltage of approximately 10 kVolts is necessary.

Prior observations of two beam coupling in PR polymers were made without regard to their applicability as a waveguide material. In fact, the geometries of the slabs in preceding polymer studies made observations of guided modes prohibitive.

The present invention relates to the first application of a PR material to a polymer waveguide which overcomes the deficiencies of high cost and inflexibility attendant with crystalline waveguide structures. The present invention also overcomes the problems of high voltages associated with PR polymer slabs. The present waveguide two beam coupling device may be used to periodically amplify optical signals. Such optical signals include those used in telephone and cable television, for example, to reduce losses as signals travel from source to end user. Periodic amplification of optical signals presently requires conversion of the optical signal to electrical signals, amplification of the electrical signal, and reconversion of this electrical signal into an optical signal which introduces delays and other inefficiencies into the system.

Other applications include the use of the polymer waveguide as a source for non-linear gain, application in a phase conjugation device to reverse the effects of transmission distortion in image processing, and use with optical switching and optical interconnect devices.

SUMMARY OF THE INVENTION

An object of the present invention is to provide a photorefractive polymer waveguide to perform waveguide two beam coupling. Further objects of the present invention include launching guided modes in a PR polymer waveguide and amplifying optical signals input to the PR polymer waveguide. The apparatus of the present invention comprises: a photorefractive polymer waveguide; means for applying an electric field to the waveguide; and a light source for providing an incident pump beam to the surface of the waveguide. The incident pump beam creates a modulated index pattern in the waveguide to launch guided modes.

A further feature of the present invention comprises a signal source for producing an input signal in the waveguide. The input signal and the incident pump beam create a modulated index pattern in the waveguide, and the incident pump beam is diffracted by the modulated index pattern to amplify the input signal in the direction of signal propagation.

BRIEF DESCRIPTION OF THE DRAWINGS

The features and advantages of the polymer waveguide according to the present invention will be more clearly understood from the following description taken in conjunction with the accompanying drawings in which.

DESCRIPTION OF THE PREFERRED EMBODIMENTS

The photorefractive polymer waveguide of the present invention is a multilayered structure. In a preferred embodiment, the waveguide comprises a 3–5 µm thick bottom buffer layer of poly(acrylic acid) (PAA) on indium tin oxide (ITO) coated glass, followed by an approximately 10 µm thick layer of the PR polymer. The polymer consists of the photoconductive polymer poly(N-vinylcarbazole) (PVK), a sensitizing agent 2,4,7-trinitro-9-fluorene (TNF), a plasticising agent 9-ethylcarbazole) (ECZ), and a nonlinear optical chromophore 4-Nitrophenyl-2-pyrrolidinemethanol (NPP) in a mixture by weight of 48.7%, 1.3%, 20%, 30%, respectively. All the materials may be dissolved in a 4:1 mixture of toluene and cyclohexanone and then passed through a teflon syringe filter with 0.2 µm pore size. All of the materials for the polymer are commercially available. The PAA and the PR polymer layers may be applied with a knife edge technique. After each layer is added, the sample may be heated to drive off the residual solvent. The PAA layer is heated to 65° C. for one hour while the finished sample is heated to 55° C. for approximately 15 minutes.

Figure 1:
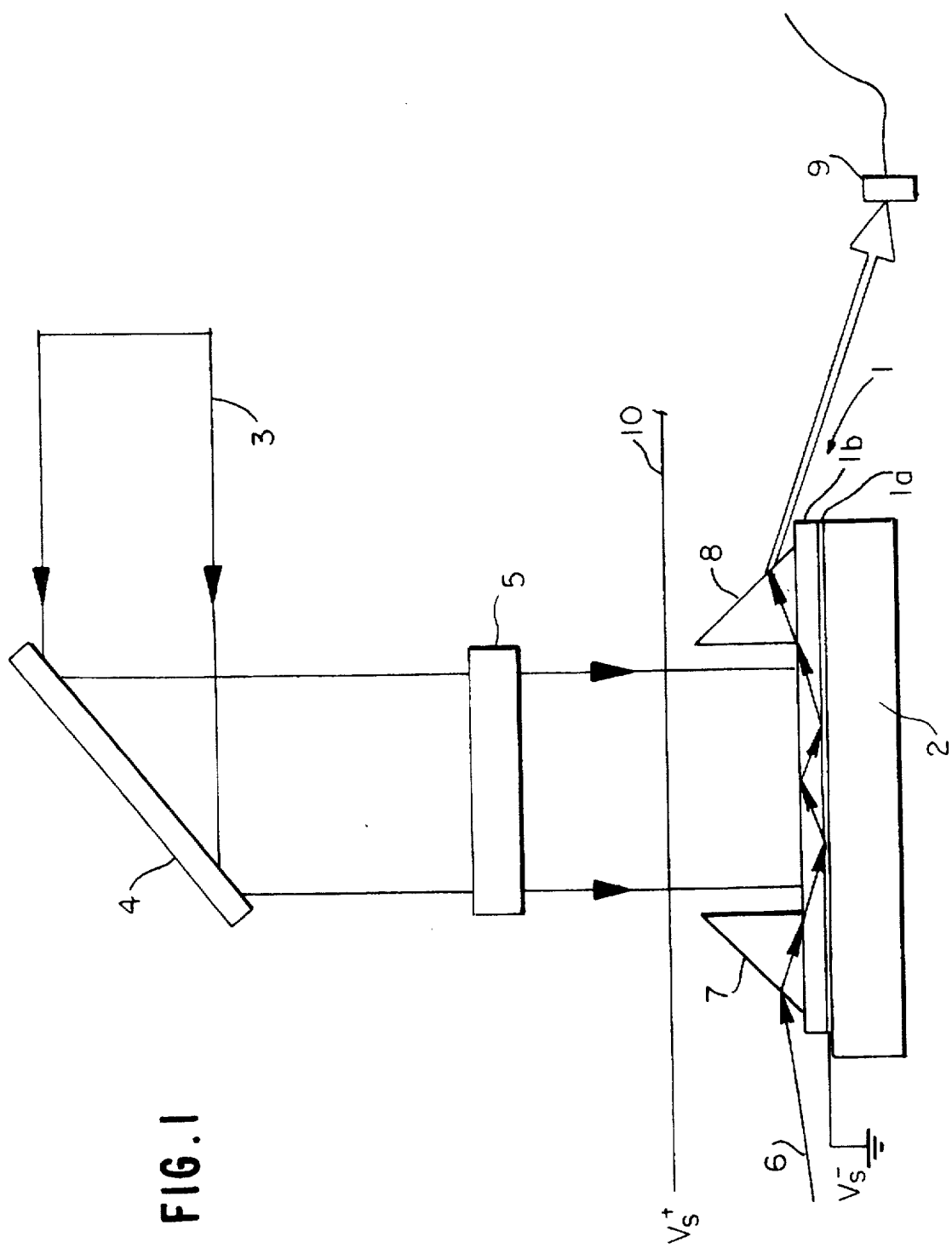
FIG. 1 is a diagram showing an arrangement to produce and evaluate the waveguide properties of an embodiment of the present invention.

The arrangement for producing guided modes and for evaluating the properties of the waveguide of the present invention are shown in FIG. 1. In this arrangement, the waveguide sample 1, comprising an indium tin oxide (ITO) layer 1a and a photorefractive polymer layer 1b, is disposed above a glass substrate 2. An external lateral pump beam 3 reflected from a mirror 4 is focused by cylindrical lens 5 to form a line at the sample. Scattered light of the incident pump beam and an input signal 6, supplied through an input prism 7, intersect with the pump beam to create two beam coupling in the polymer sample. The guided modes are propagated and amplified through the sample, and the light is refracted by an output prism 8 and recorded by a photodetector 9.

In order to observe the waveguide two beam coupling, an electric field must be applied to the waveguide material to introduce the charge separation created by the photoconductive effect and to provide and alignment field for the electrooptic effect.

One method of producing the field is by corona charging. The applied electric field can be provided by suspending a tungsten corona wire 10 about 1 cm above the sample surface while grounding the ITO layer 1a. Typically, the potential required to reach the onset of corona is about 5–7 kV, at which point 2–5 µA of current are drawn. The field can be estimated by monitoring the change in the height of the absorption peak of a typical sample with and without the field applied in a spectrometer. The field is derived from the measured order parameter and knowledge of the dipole moment of NPP in the polymer.

Figure 2:
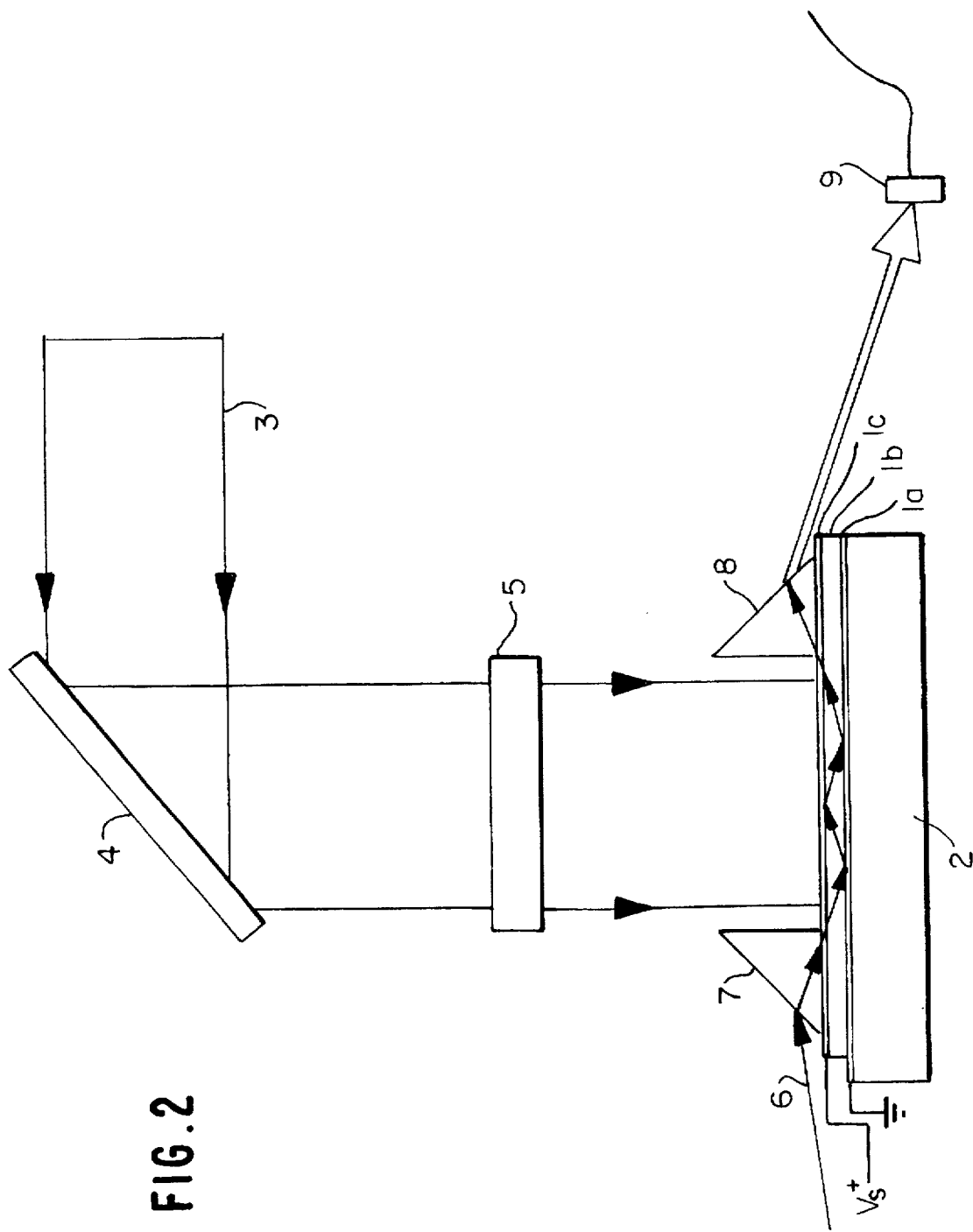
FIG. 2 is a diagram showing an arrangement to produce and evaluate the waveguide properties of an alternative embodiment of the present invention.

An alternative method of providing the electric field is shown in FIG. 2. In this situation, a transparent ITO film 1c is deposited by a sputtering method on the upper surface of the sample. A voltage is applied to the ITO films 1a and 1c. Using this arrangement, the necessary electric field can be created with the application of a few hundred volts to the ITO films.

It is further noted that guided waves can be observed in the PR polymer waveguide through the use of an external pump beam alone, in the absence of an input signal beam. This is due to light scattering by the PR material and the scattered light's interference with the incident pump beam to create the light interference pattern.

EXAMPLE 1

A photorefractive polymer composite PVK/TNF/ECZ/NPP was constructed using the procedure described above. The electric field was supplied by corona charging. Using this method, the estimated maximum applied field was about 140 V/µm.

To characterize the PR polymer, the photoconductive sensitivity, electro-optic coefficient, degenerate four wave mixing (DFWM) diffraction efficiency, and the two beam coupling gain coefficient were measured using commonly known techniques.

At an applied field of 50 V/µm and an incident wavelength of 710 nm, the photoconductive sensitivity, electro-optic coefficient, diffraction efficiency (for a 140 µm thick sample) and the TBC gain coefficient were 2.2 $(\Omega\text{-cm})^{-1}/(W/cm^2)$, 5.5 pm/V, 3.5%, and approximately ~9 $cm^{-1}$, respectively. The observation of asymmetric TBC provides proof that the material is photorefractive.

For waveguide applications, one of the most important material parameters is the absorption coefficient. To determine this parameter, a simple transmission loss technique using a thick (about 1 mm) film was used. The measured absorption coefficients are shown by the plotted circles of FIG. 3. In a waveguide ~5 µm thick, this level of absorption allowed the observation of visible guided streak lengths of about 2–3 cm at 750 nm using 30–40 mW of input power and a prism coupler.

Using the arrangement of FIG. 1, the WTBC of the polymer waveguide was analyzed with respect to input power, input wavelength, and input angle for s- and p-polarized light. The relationship between the rise time of the guided beams' power and pump power was also determined. When the pump beam was s-polarized, the output was obtained when a negative voltage was applied to the corona wire. For the case of a p-polarized pump beam, the output was obtained when a positive voltage was applied to the corona wire. In either case, the overall power would fluctuate on a time scale of ~1 second. At the same time, the mode lines tended to fluctuate independently of each other. The power in each mode would oscillate on a time scale of less than one second. This fluctuation is possibly due to variations in the applied field as a result of migration of the applied surface charge. Generally for the s-polarized case, most of the output power was found in the ten lowest order modes. For the p-polarized case, the output power was more evenly distributed among the modes.

Figure 3:
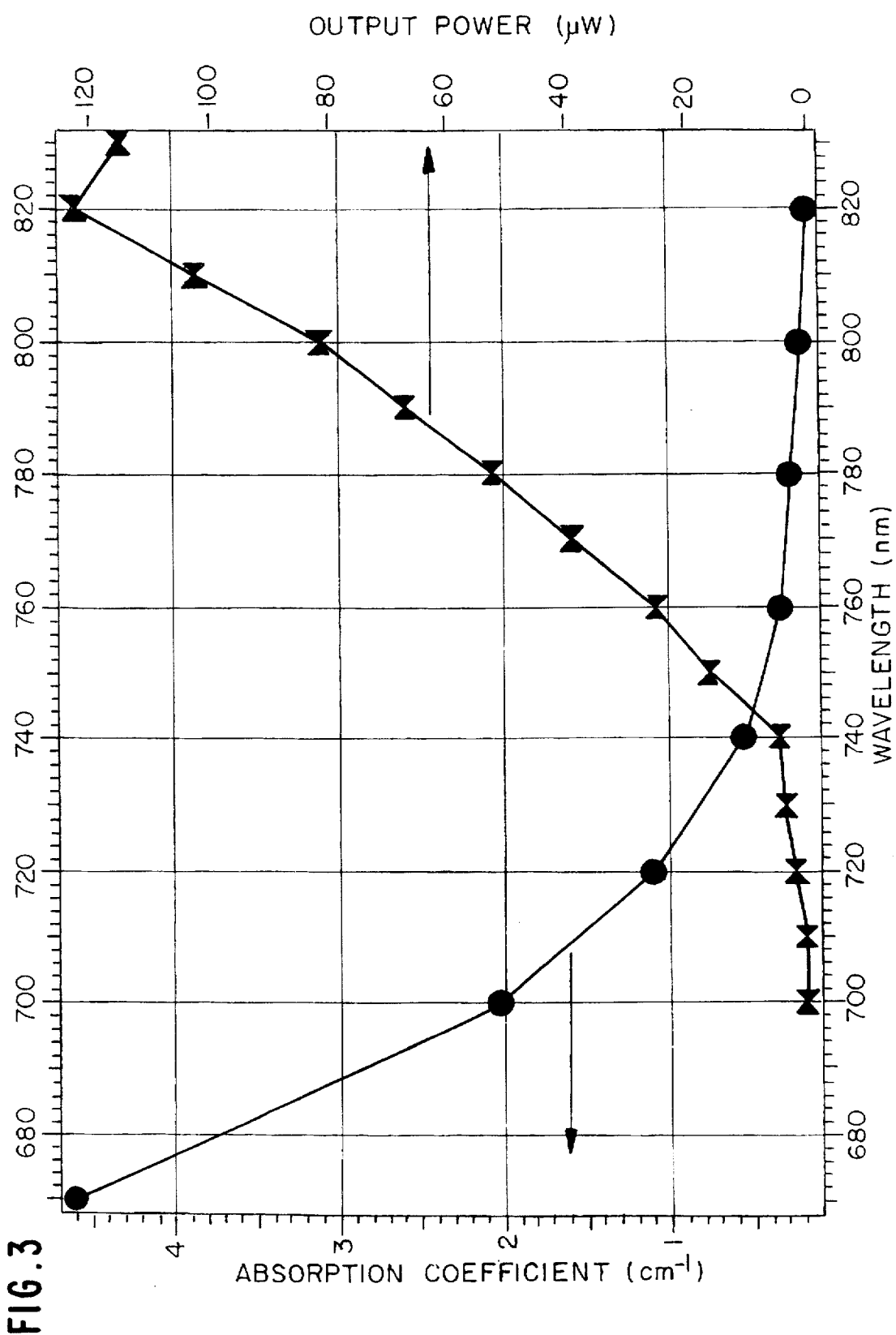
FIG. 3 shows the dependence of the waveguide two beam coupling (WTBC) output power and the absorption coefficient on incident wavelength for the polymer waveguide of the present invention.

FIG. 3 further indicates that within a range of available wavelengths, the material absorption strongly determines the amount of output power as shown by the plotted crossties. This is the case because the launched light must travel through ~1 cm of material before reaching the output coupler. Thus, any decrease in absorption or scattering loss, as is the case at longer wavelengths, will allow more light to reach the output coupler and be detected. Peak response has been found to occur at 820 nm for a system having an NPP base.

Figure 4:
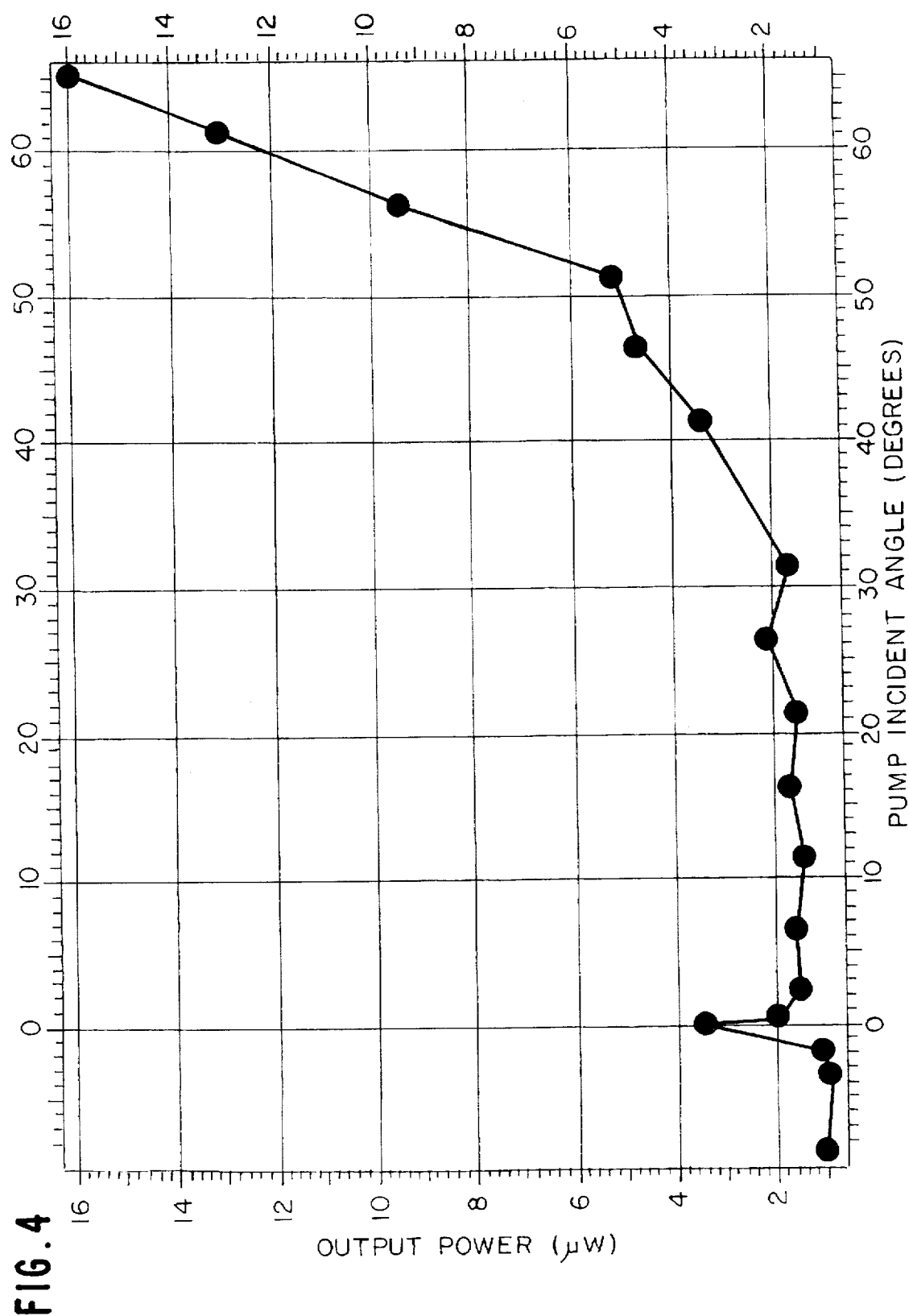
FIG. 4 shows the dependence of the output power on the incident angle of the pump for a polymer waveguide of the present invention.

In the absence of the input signal 6 and input prism 7, the range of incident pump angles could be varied from −10° to 70° (where negative angles of pump incidence refer to the case where the pump is propagating in the opposite direction to the guided wave). The presence of the output signal beam resulted from waveguide two beam coupling. The dependence of the output signal power on the angle of incidence of the pump beam is shown in FIG. 4. The results show the power of the out-coupled signal beam as a function of the angle of incidence of the pump at 750 nm. At normal incidence, the pump was 2 mm long and 0.2 mm wide.

The growth in output power at higher angles of incidence can be explained by two effects. The first is the increase in the projection of the grating wave vector along the poling direction. This increased projection allows the grating to utilize the largest electro-optic coefficient ($r_{33}$) and thus form a more efficient grating. The second is the increase in the interaction length, which results as the pump beam is spread over more of the sample at oblique angles. This longer interaction length allows for more signal gain and thus more output power.

Figure 5:
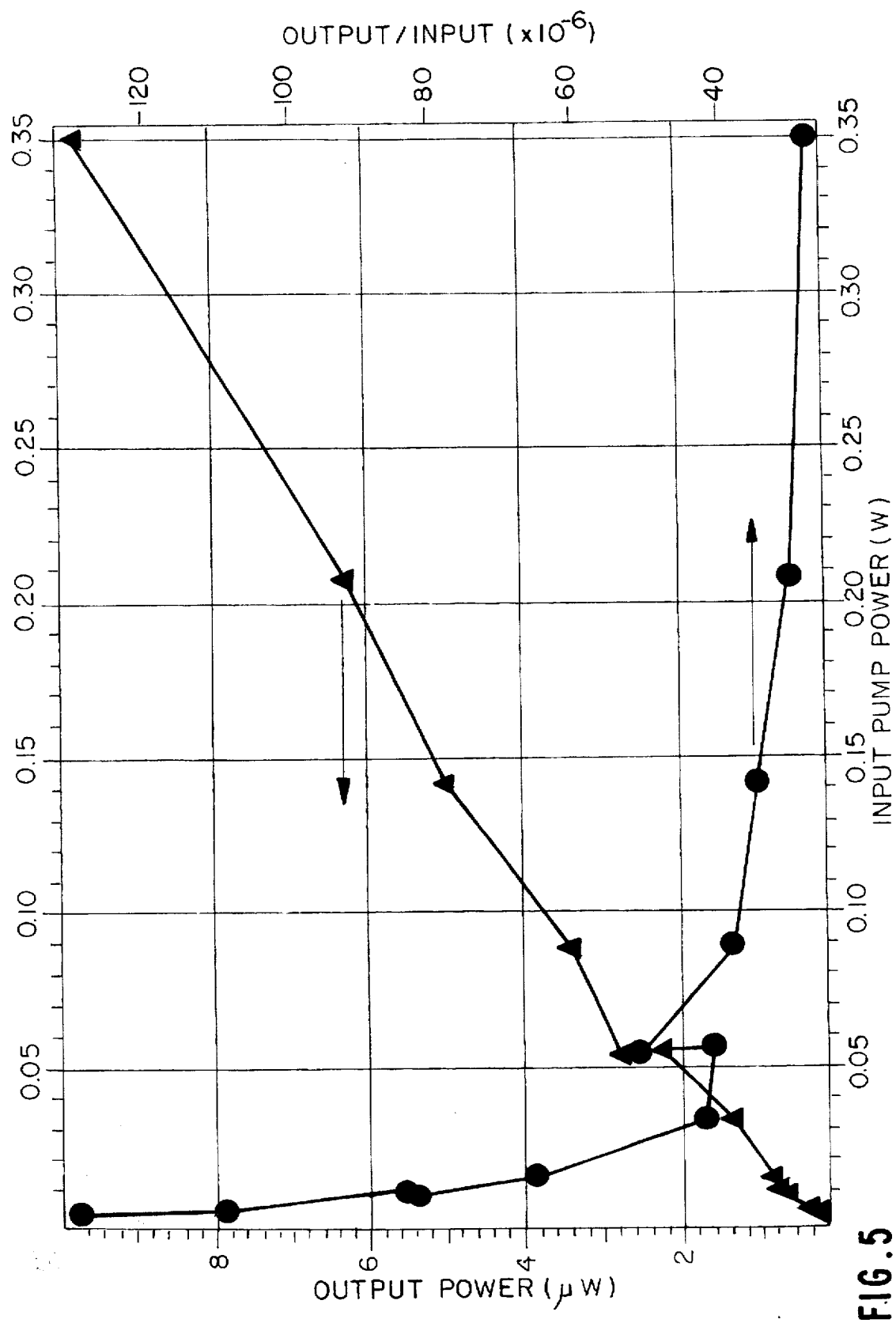
FIG. 5 shows WTBC output power and the ratio of output/input as a function of input pump power for a polymer waveguide of the present invention.

FIG. 5 shows the dependence of output power and the gain on input power. For these measurements, the pump beam was s-polarized with a wavelength of 750 nm. The poling current was 2 µA with −6.1 kV applied to a corona wire. The angle of incidence of the pump was 65° from the sample normal. As expected, the output increased with the input. However, the output appears to level off at higher input powers as is clearly demonstrated by the gain plot. This is an indication that as the input power is increased, a smaller fraction of the input is coupled into the waveguide. This is possibly due to the fact that the gratings become washed out as the input power increases.

Figure 6:
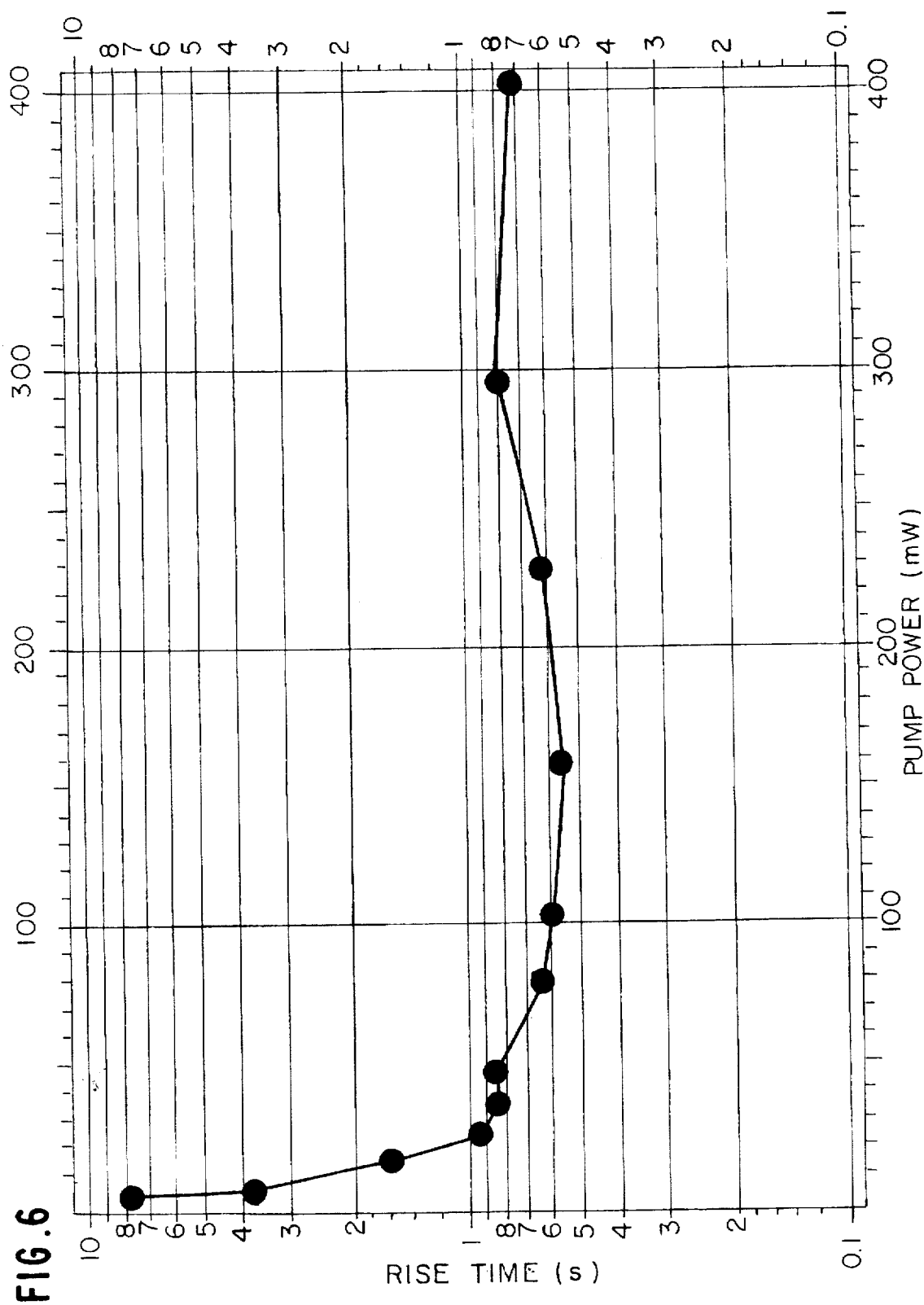
FIG. 6 shows grating growth time as a function of input power for a polymer waveguide of the present invention.

FIG. 6 shows the relationship between output power rise time and the input pump power. The rise time is defined as the time after the pump was incident on the slab, with the field already applied, until the output signal rose to 90% of its final maximum value. The results shown are for a wavelength of 750 nm and an angle of incidence of 60°. Clearly, the rise time was faster at the higher pump powers, reaching a saturated level at large input powers. This saturation is so pronounced that there is essentially no change in rise time for the range of input powers from 20 to 400 mW while the rise time decreases by a factor of ~8 in the range from 2 to 20 mW.

Although a particular embodiment of the present invention has been shown and described, it will be obvious to those skilled in the art that various changes and modifications may be made without departing from the spirit and scope of the present invention.

What is claimed is:

1. A polymer waveguide device comprising:

a waveguide comprising a thin photorefractive polymer layer;

a field generating means for applying an electric field to said polymer waveguide; and a single light source which provides light to a surface of said waveguide;

wherein said waveguide scatters light beams provided by said single light source and said scattered light beams interfere with incident light beams from said light source to create a modulated index pattern in said waveguide, said modulated index pattern diffracting said incident light to launch guided modes in said waveguide.

2. The polymer waveguide device of claim 1, wherein said polymer layer has a thickness less than 15 µm.

3. The polymer waveguide device of claim 2, wherein said field generating means comprises corona charging.

4. The polymer waveguide device of claim 2, wherein said waveguide further comprises a plurality of layers of indium tin oxide (ITO), wherein a layer of ITO is disposed above said polymer layer and another ITO layer is disposed beneath said polymer layer and said field generating means comprises a voltage source applied to said ITO layers.

5. The polymer waveguide device of claim 2, wherein said light source provides light to a surface of said waveguide at an angle of incidence in the range of 50° to 70° as measured from the normal of said waveguide surface.

6. A polymer waveguide device comprising:

a waveguide comprising a thin photorefractive polymer layer;

a field generating means for applying an electric field to said polymer waveguide;

a light source which provides pumping light to said waveguide; and a means for introducing a signal beam to be transmitted through said waveguide in a direction of input;

wherein said signal beam interferes with said pumping light to produce a modulated index pattern in said waveguide, said modulated index pattern diffracting said pumping light to amplify said signal beam in said direction of input, and wherein said polymer layer has a thickness less than 15 µm.

7. The polymer waveguide device of claim 6, wherein said field generating means comprises corona charging.

8. The polymer waveguide device of claim 6, wherein said polymer waveguide further comprises a plurality of layers of indium tin oxide (ITO), wherein a layer of ITO is disposed above said polymer layer and another ITO layer is disposed beneath said polymer layer and said field generating means comprises a voltage source applied to said ITO layers.

9. The polymer waveguide device of claim 6 wherein said light source provides light to a surface of said waveguide at an angle of incidence in the range of 50° to 70° as measured from the normal of said waveguide surface.

10. The polymer waveguide device of claim 1, wherein said light source provides light to a surface of said waveguide at an angle of incidence in the range of 60°–70° as measured from the normal of the waveguide surface.

11. The polymer waveguide device of claim 2, wherein said light source provides light to a surface of said waveguide at an angle of incidence in the range of 60°–70° as measured from the normal of the waveguide surface.

12. The waveguide device of claim 7, wherein said polymer layer has a thickness in the range of 5–10 µm.

13. The polymer waveguide device of claim 7, wherein said light source provides light to a surface of said waveguide at an angle of incidence in the range of 60°–70° as measured from the normal of the waveguide surface.

* * * * *